United States Patent
Shoda et al.

(10) Patent No.: US 9,303,614 B2
(45) Date of Patent: Apr. 5, 2016

(54) INTERNAL COMBUSTION ENGINE AUTOMATIC STOP/RESTART DEVICE AND INTERNAL COMBUSTION ENGINE AUTOMATIC STOP/RESTART METHOD

(71) Applicant: Mitsubishi Electric Corporation, Chiyoda-ku, Tokyo (JP)

(72) Inventors: Tomohisa Shoda, Chiyoda-ku (JP); Takeru Okabe, Chiyoda-ku (JP); Osamu Ishikawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 408 days.

(21) Appl. No.: 14/010,768

(22) Filed: Aug. 27, 2013

(65) Prior Publication Data

US 2014/0326208 A1 Nov. 6, 2014

(30) Foreign Application Priority Data

May 1, 2013 (JP) .................. 2013-096248

(51) Int. Cl.
*F02N 11/08* (2006.01)
*F02N 11/10* (2006.01)

(52) U.S. Cl.
CPC ........ *F02N 11/0833* (2013.01); *F02N 11/0851* (2013.01); *F02N 11/101* (2013.01); *F02N 11/0814* (2013.01); *F02N 2200/022* (2013.01); *F02N 2250/04* (2013.01)

(58) Field of Classification Search
CPC ..... F02N 11/08; F02N 11/0833; F02N 11/04; F02N 11/0803; F02N 11/0814; F02N 11/0818; F02N 11/0825; F02N 11/0829; F02N 11/0837; F02N 11/084; F02N 11/0844; F02N 11/0848; F02N 11/0855; F02N 2200/021; F02N 2250/04; F02N 2250/06; F02N 2300/00; F02D 45/00

USPC ............. 123/185.13, 179.1–179.24; 60/631, 60/39.13; 701/112–115

See application file for complete search history.

(56) References Cited

U.S. PATENT DOCUMENTS

| | | | | |
|---|---|---|---|---|
| 9,022,001 | B2 * | 5/2015 | Shafto | F02N 11/106 123/179.3 |
| 9,074,529 | B2 * | 7/2015 | Kawasumi | F02B 75/02 |
| 2006/0081207 | A1 * | 4/2006 | Nakamura | F01L 13/0026 123/179.3 |

(Continued)

FOREIGN PATENT DOCUMENTS

CN 103016233 A 4/2013

OTHER PUBLICATIONS

Communication dated Oct. 10, 2015, issued by the State Intellectual Property Office of the P.R.C. in counterpart Chinese Application No. 2013106112006.

*Primary Examiner* — Hai Huynh
*Assistant Examiner* — John Bailey
(74) *Attorney, Agent, or Firm* — Sughrue Mion, PLLC; Richard C. Turner

(57) ABSTRACT

Provided are an internal combustion engine automatic stop/restart device and an internal combustion engine automatic stop/restart method capable of appropriately releasing a drive inhibition state of a starter (200) depending on an RPM of an internal combustion engine (101). The drive inhibition state of the starter is released when a drive inhibition release determination period, which is set depending on a time interval between a time point when a first reverse rotation crank signal is detected and a time point when a second reverse rotation crank signal is detected and a drive permission lower limit value corresponding period corresponding to a starter drivable RPM lower limit value, elapses before a third reverse rotation crank signal is input.

3 Claims, 9 Drawing Sheets

(56) References Cited

U.S. PATENT DOCUMENTS

| | | | |
|---|---|---|---|
| 2008/0010037 A1* | 1/2008 | Hashizume | F02D 41/009 702/151 |
| 2008/0092841 A1* | 4/2008 | Takahashi | F02D 41/009 123/179.16 |
| 2011/0146609 A1* | 6/2011 | Enoki | F02N 11/0818 123/179.3 |
| 2011/0155085 A1* | 6/2011 | Hirano | F02N 11/0844 123/179.3 |
| 2012/0192826 A1* | 8/2012 | Shafto | F02N 11/106 123/179.3 |
| 2013/0180490 A1* | 7/2013 | Odahara | F02N 15/00 123/179.4 |
| 2013/0289855 A1* | 10/2013 | Kitano | F02N 11/00 701/113 |

* cited by examiner

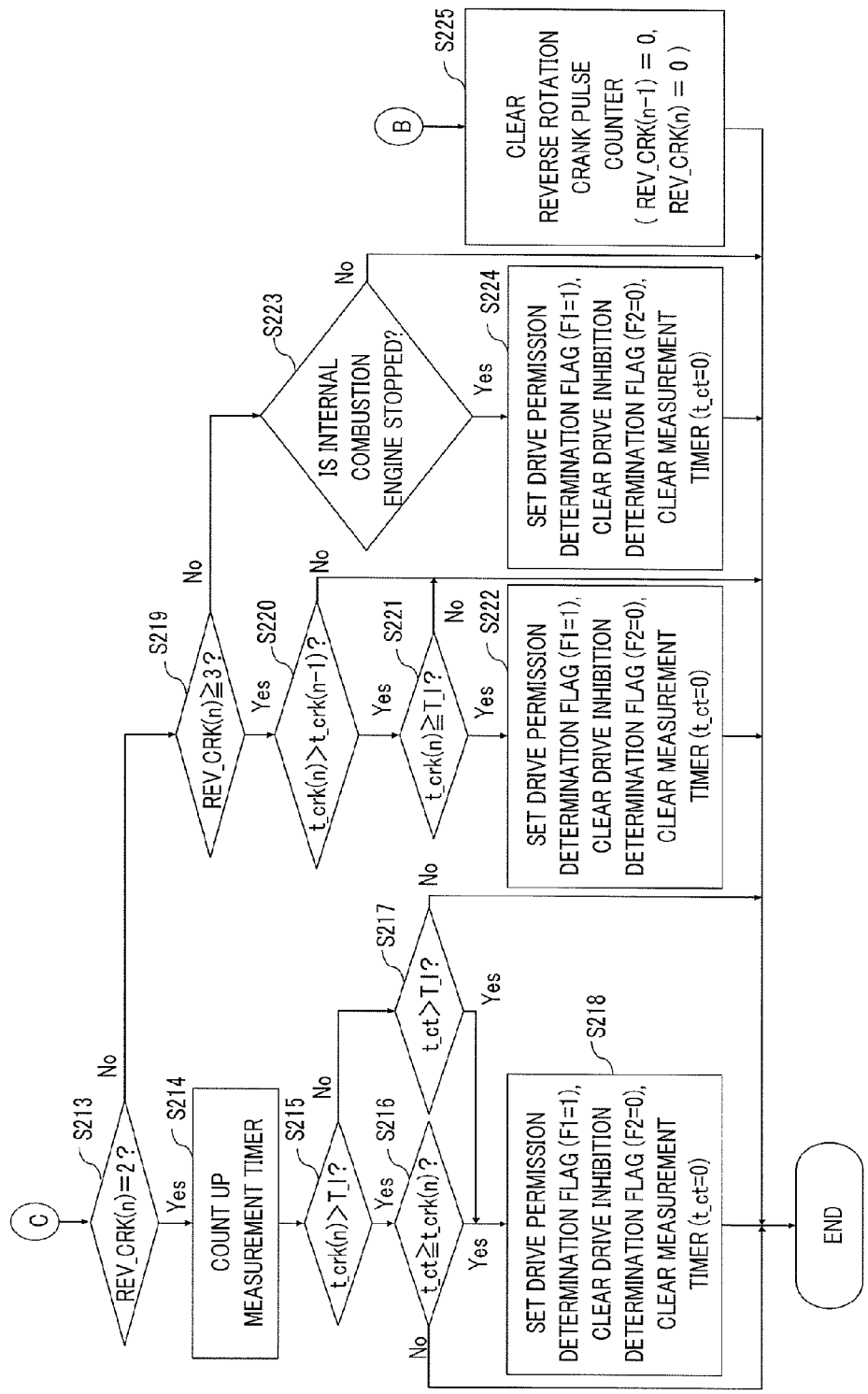

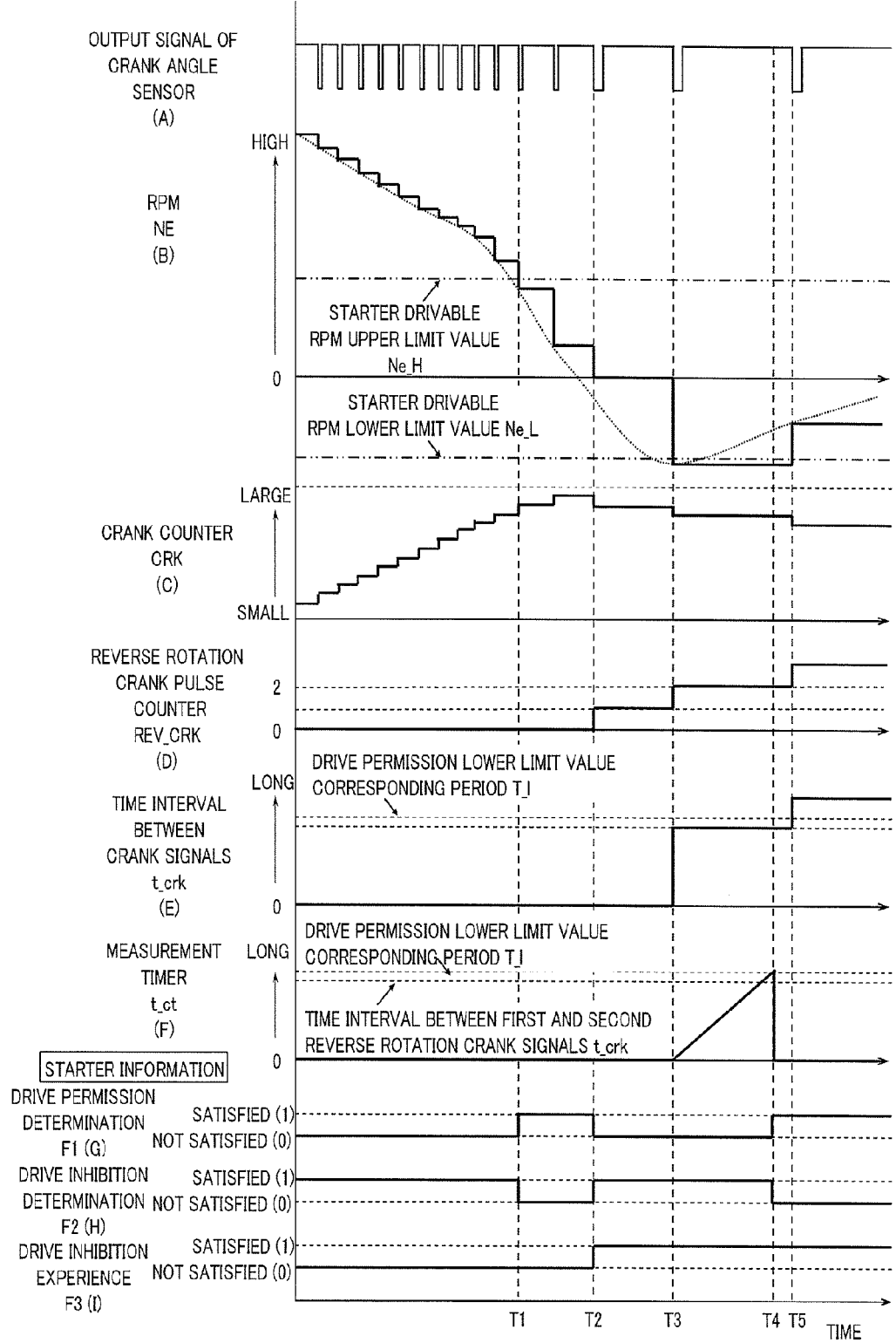

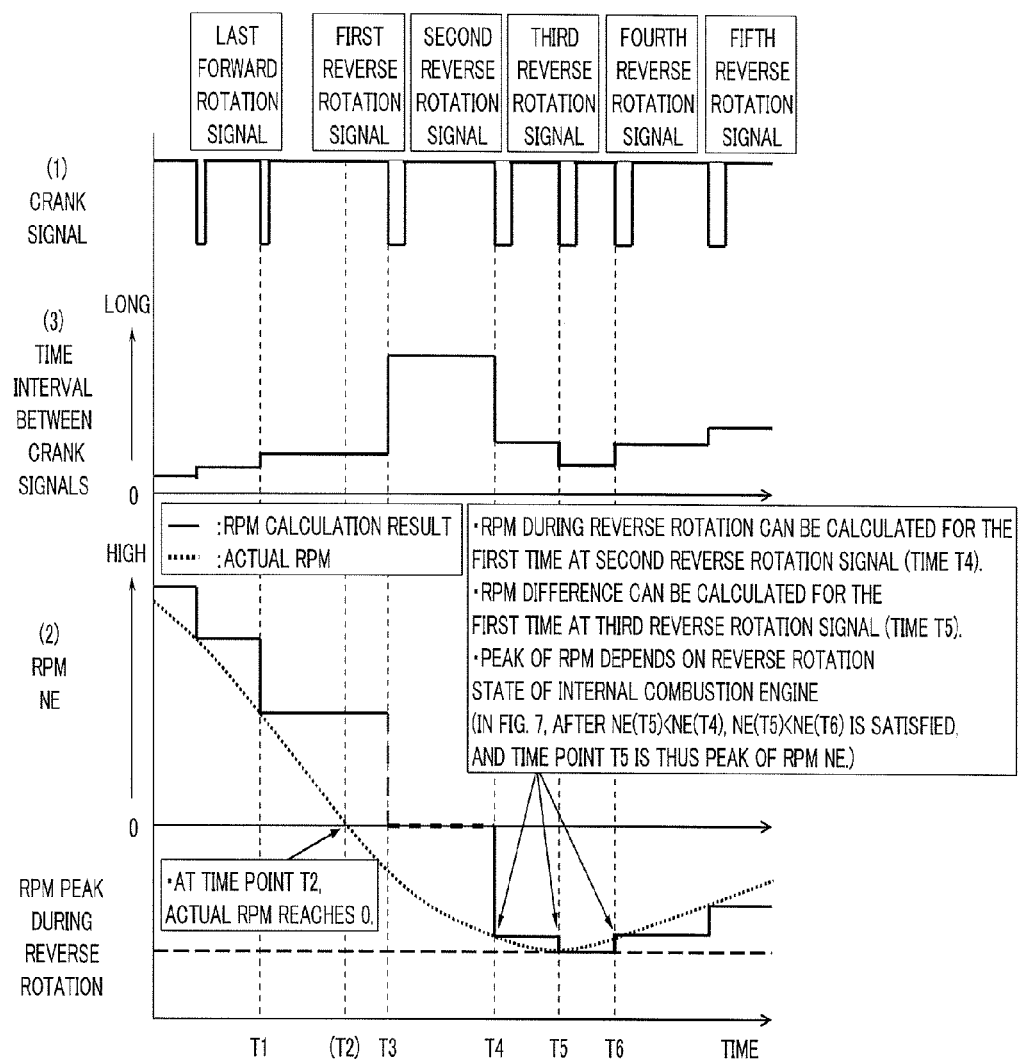

INTERNAL COMBUSTION ENGINE AUTOMATIC STOP/RESTART DEVICE AND INTERNAL COMBUSTION ENGINE AUTOMATIC STOP/RESTART METHOD

BACKGROUND OF THE INVENTION

1. Field of the Invention

The present invention relates to an internal combustion engine automatic stop/restart device and an internal combustion engine automatic stop/restart method for stopping an internal combustion engine when an automatic stop requirement is satisfied, and restarting the internal combustion engine when a restart requirement is satisfied.

2. Description of the Related Art

In recent years, an internal combustion engine automatic stop/restart device (namely, a device for carrying out so-called idling stop) in combination with an internal combustion engine is generally installed on a vehicle mainly in order to reduce a fuel consumption. Such an internal combustion engine automatic stop/restart device stops the internal combustion engine when a predetermined automatic stop requirement based on a deceleration or stop operation by a driver is satisfied, and restarts the internal combustion engine when a restart requirement based on a start or acceleration operation by the driver is satisfied.

Moreover, as an example of an operation of the internal combustion engine automatic stop/restart device, in order to prevent an excessive load from being applied to, for example, a starter or a power transmission system, when a rotation state of the automatically stopping internal combustion engine is a reverse rotation state, a drive inhibition state of the starter is set to inhibit the restart of the internal combustion engine, which is automatically stopping. Then, after an RPM peak of the internal combustion engine having the rotation state in the reverse rotation state is directly detected (after the RPM of the internal combustion engine takes the minimum value), when the RPM becomes equal to or more than a predetermined RPM, the drive inhibition state of the starter is released.

However, the conventional technology has the following problems.

According to the conventional technology, in order to detect the RPM peak of the internal combustion engine, it is necessary to detect a reverse rotation crank signal (reverse rotation crank angle) of the internal combustion engine at least three times. Therefore, if a period when the rotation state of the internal combustion engine is the reverse rotation state is short, and the reverse rotation crank signal can thus be detected, for example, only twice, the RPM peak cannot be detected.

In this case, there has been such a problem that the drive inhibition state of the starter cannot be appropriately released depending on the rotation state of the internal combustion engine. Moreover, as a result, the drive inhibition state of the starter cannot be released until the rotation of the internal combustion engine stops completely (for example, a period of approximately 200 milliseconds), and there has been such a problem that the period of the drive inhibition state can unnecessarily long.

SUMMARY OF THE INVENTION

The present invention has been made in view of the above-mentioned problems, and therefore has an object to provide an internal combustion engine automatic stop/restart device and an internal combustion engine automatic stop/restart method capable of properly releasing a drive inhibition state of a starter after an automatic stop requirement for an internal combustion engine is satisfied depending on a rotation state of the internal combustion engine, and restraining a period of the drive inhibition state of the starter to the minimum period.

There is provided an internal combustion engine automatic stop/restart device for stopping an internal combustion engine when an automatic stop requirement for automatically stopping the internal combustion engine is satisfied, and restarting the internal combustion engine when a restart requirement for restarting the internal combustion engine is satisfied after the automatic stop requirement is satisfied, the internal combustion engine automatic stop/restart device including: a starter for starting the internal combustion engine; an RPM calculation unit for calculating an RPM of the internal combustion engine based on a crank signal, which is an output signal of a crank angle detection unit for detecting a crank angle of the internal combustion engine; a rotation direction determination unit for determining whether the crank signal output by the crank angle detection unit is a forward rotation crank signal corresponding to a case where a rotation state of the internal combustion engine is a forward rotation state or a reverse rotation crank signal corresponding to a case where the rotation state is a reverse rotation state; a drive inhibition determination unit for bringing the starter into a drive inhibition state when the RPM calculated by the RPM calculation unit is not included in a drivable RPM range from a starter drivable RPM lower limit value to a starter drivable RPM upper limit value, which are prescribed in advance, and bringing the starter into the drive inhibition state when the crank signal output by the crank angle detection unit changes from the forward rotation crank signal to the reverse rotation crank signal; a drive inhibition release unit for calculating, when the crank angle detection unit outputs a second reverse rotation crank signal after outputting a first reverse rotation crank signal, which is a first reverse rotation crank signal when the forward rotation crank signal changes to the reverse rotation crank signal, a time interval between a first time point when the first reverse rotation crank signal is input and a second time point when the second reverse rotation crank signal is input, and releasing the drive inhibition state when a third reverse rotation crank signal is not input following the second reverse rotation crank signal until a drive inhibition release determination period set depending on the calculated time interval and a drive permission lower limit value corresponding period, which is a period acquired by converting the starter drivable RPM lower limit value, elapses from the second time point; and a restart control unit for driving the starter to restart the internal combustion engine when the restart requirement is satisfied and the starter is not in the drive inhibition state, in which when the time interval is shorter than the drive permission lower limit value corresponding period, the drive inhibition release unit sets the drive permission lower limit value corresponding period as the drive inhibition release determination period, and when the time interval is equal to or longer than the drive permission lower limit value corresponding period, the drive inhibition release unit sets the time interval as the drive inhibition release determination period.

There is provided an internal combustion engine automatic stop/restart method to be carried out by an engine control unit (ECU) in an internal combustion engine automatic stop/restart device including a starter for starting an internal combustion engine, the internal combustion engine automatic stop/restart method including: an automatic stop control step of stopping the internal combustion engine when an automatic stop requirement for automatically stopping the internal combustion engine is satisfied; an RPM calculation step of calculating an RPM of the internal combustion engine based on a crank signal, which is an output signal of a crank angle detection unit for detecting a crank angle of the internal combustion engine; a drive inhibition determination step of bringing the starter into a drive inhibition state when the RPM calculated in the RPM calculation step is not included in a drivable RPM range from a starter drivable RPM lower limit value to a starter drivable RPM upper limit value, which are prescribed in advance, and bringing the starter into the drive inhibition state when the crank signal output by the crank angle detection unit changes from a forward rotation crank signal to a reverse rotation crank signal; a drive inhibition release step of calculating, when the crank angle detection unit outputs a second reverse rotation crank signal after outputting a first reverse rotation crank signal, which is a first reverse rotation crank signal when the forward rotation crank signal changes to the reverse rotation crank signal, a time interval between a first time point when the first reverse rotation crank signal is input and a second time point when the second reverse rotation crank signal is input, and releasing the drive inhibition state when a third reverse rotation crank signal is not input following the second reverse rotation crank signal until a drive inhibition release determination period set depending on the calculated time interval and a drive permission lower limit value corresponding period, which is a period acquired by converting the starter drivable RPM lower limit value, elapses from the second time point; and a restart control step of driving the starter to restart the internal combustion engine when a restart requirement for restarting the internal combustion engine is satisfied after the automatic stop requirement is satisfied, and the starter is not in the drive inhibition state, in which the drive inhibition release step includes setting the drive permission lower limit value corresponding period as the drive inhibition release determination period when the time interval is shorter than the drive permission lower limit value corresponding period, and setting the time interval as the drive inhibition release determination period when the time interval is equal to or longer than the drive permission lower limit value corresponding period.

According to the present invention, the drive inhibition state of the starter is released when the drive inhibition release determination period set depending on the time interval between the time point when the first reverse rotation crank signal is detected and the time point when the second reverse rotation crank signal is detected and the drive permission lower limit value corresponding period corresponding to the starter drivable RPM lower limit value elapses before the third reverse rotation crank signal is input. It is thus possible to provide the internal combustion engine automatic stop/restart device and the internal combustion engine automatic stop/restart method capable of properly releasing the drive inhibition state of the starter after the automatic stop requirement for the internal combustion engine is satisfied depending on the rotation state of the internal combustion engine, and restraining the period of the drive inhibition state of the starter to the minimum period.

BRIEF DESCRIPTION OF THE DRAWINGS

In the accompanying drawings:
FIG. 4C is a flowchart illustrating the drive permission/drive inhibition determination processing for the starter executed by the internal combustion engine automatic stop/restart device according to the first embodiment of the present invention;
FIG. 5 is an explanatory diagram showing an example of operations carried out at respective time points by the internal combustion engine automatic stop/restart device according to the first embodiment;
FIG. 7 is an explanatory diagram in a case where an internal combustion engine automatic stop/restart device according to a conventional technology detects an RPM peak when a rotation state of an internal combustion engine is a reverse rotation state.

DETAILED DESCRIPTION OF THE PREFERRED EMBODIMENT

Figure 1:
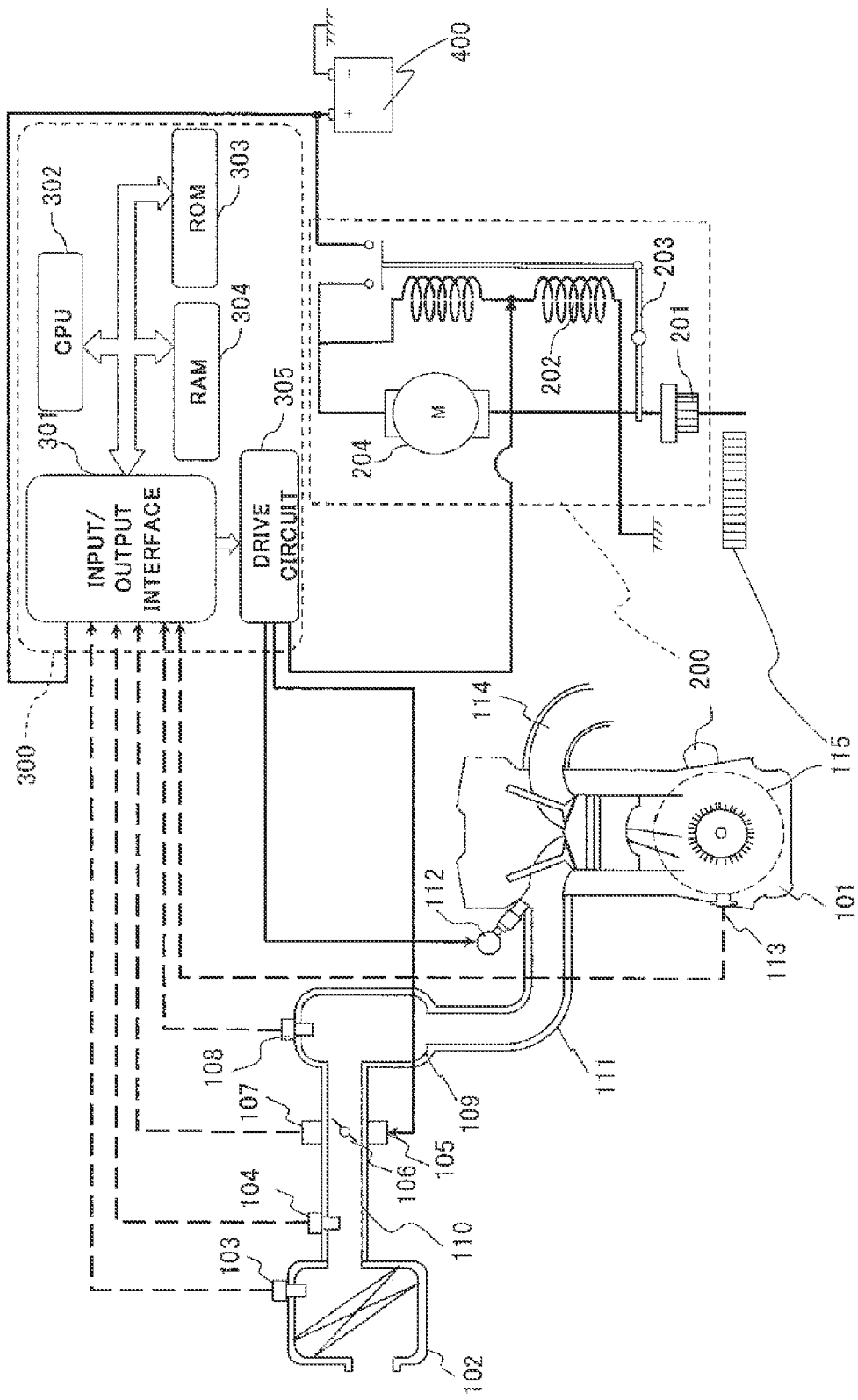
FIG. 1 is a configuration diagram illustrating a schematic configuration of an internal combustion engine automatic stop/restart device according to a first embodiment of the present invention.

A description is now given of an internal combustion engine automatic stop/restart device and an internal combustion engine automatic stop/restart method according to a preferred embodiment of the present invention referring to the drawings. Note that, like components are denoted by like reference symbols, and overlapping descriptions thereof are omitted in descriptions of the drawings.

First Embodiment

Referring to FIG. 7, first, in order to clearly describe technical features of the present invention, a detailed description is given of the above-mentioned problems of the conventional technology. FIG. 7 is an explanatory diagram of a case where the internal combustion engine automatic stop/restart device according to the conventional technology detects an RPM peak when a rotation state of an internal combustion engine is a reverse rotation state.

FIG. 7 shows temporal changes in crank signals (1), an RPM NE (2), and a time interval between crank signals (3). Note that, regarding illustration of the RPM NE (2), a solid line represents a calculated RPM NE (RPM calculation result) and a dotted line represents an actual RPM of the internal combustion engine. Moreover, the RPM during the reverse rotation of the internal combustion engine is represented by a negative number for the sake of convenience.

On this occasion, the RPM NE of the internal combustion engine is generally calculated from a time interval between predetermined crank angles (such as 60 degrees before the top dead center) or a time interval corresponding to a crank angle (such as 30 degrees). However, in a case where the rotation state of the internal combustion engine changes such as a case where the internal combustion engine starts rotating or a case where the rotation changes from the forward rotation to the reverse rotation, a time point when the change in rotation state occurs cannot be determined by detecting the crank angle.

Thus, a time point when a first reverse rotation crank signal which is detected for the first time after the change in rotation state occurs is detected (a time point when a first reverse rotation crank angle is detected) is assumed as a start time point of the change in rotation state. Specifically, when the rotation of the internal combustion engine changes from the forward rotation to the reverse rotation, a reverse rotation start time point corresponds to a time point when the first reverse rotation crank signal is detected. Moreover, in this case, a reverse rotation crank signal is detected for the first time, and the RPM NE of the internal combustion engine corresponding to the time point when the reverse rotation crank signal is detected cannot thus be calculated.

Moreover, if the rotation state (RPM) of the internal combustion engine exhibits, for example, a behavior exemplified in FIG. 7, detection of the reverse rotation crank signal twice enables calculation of the RPM during the reverse rotation for the first time. Specifically, at a time point T4, the RPM during the reverse rotation can be calculated for the first time. Note that, at a time point T3 when the reverse rotation crank signal is detected for the first time, for the sake of convenience, the RPM NE is set to 0 (Note that, the actual RPM of the internal combustion engine becomes 0 at a time point T2).

Moreover, if the reverse rotation crank signal is detected three times, an RPM difference can be calculated for the first time. Specifically, at a time point T5, the RPM difference can be calculated for the first time.

Thus, the internal combustion engine automatic stop/restart device according to the conventional technology detects the RPM peak during the reverse rotation by calculating the RPM after the time point when the second reverse rotation crank signal is detected.

Specifically, in accordance with respective magnitudes of RPMs NE(T4), NE(T5), and NE(T6) calculated at respective time points T4, T5, and T6, the RPM NE(T5) is detected as the RPM peak. Then, after the RPM peak is detected, a drive inhibition state of a starter is released, and if a restart requirement is satisfied, the internal combustion engine restarts.

However, when the RPM peak is thus detected during the reverse rotation, as described above, the period in which the rotation state of the internal combustion engine is the reverse rotation state is short, and, for example, the reverse rotation crank signal can be detected only twice. As a result, in this case, the drive inhibition state of the starter cannot be appropriately released in accordance with the rotation state of the internal combustion engine.

In contrast, the present invention has a technical feature in that the drive inhibition state of a starter 200 is released when a drive inhibition release determination period set in accordance with a time interval between a time point when a first reverse rotation crank signal is detected and a time point when a second reverse rotation crank signal is detected and a drive permission lower limit value corresponding period corresponding to a starter drivable RPM lower limit value has elapsed before a third reverse rotation crank signal is input. As a result, the drive inhibition state of the starter can be appropriately released in accordance with the rotation state of the internal combustion engine.

Referring to FIG. 1, a description is now given of the internal combustion engine automatic stop/restart device according to a first embodiment of the present invention. FIG. 1 is a configuration diagram illustrating a schematic configuration of the internal combustion engine automatic stop/restart device according to the first embodiment of the present invention. Note that, in FIG. 1, in addition to the internal combustion engine automatic stop/restart device, an internal combustion engine 101 and its peripheral components are illustrated.

First, a description is given of the internal combustion engine 101 (hereinafter referred to as "engine 101"), to which the internal combustion engine automatic stop/restart device according to the first embodiment is applied, by way of specific examples. Note that, the configuration, the operation, and the like of the engine 101 are not limited to details described below, and the present invention can be applied to types of engine other than the exemplified engine 101.

As illustrated in FIG. 1, through an air filter 102, an intake pipe 110, a surge tank 109, and an intake manifold 111, air is supplied to each of cylinders of the engine 101.

On the air filter 102, an intake air temperature sensor 103 for detecting the temperature of intake air is provided. Moreover, on the intake pipe 110, an air flow sensor 104 for detecting an air amount of the intake air, a throttle valve 106 for controlling a flow rate of the intake air, and a throttle opening sensor 107 for detecting an opening of the throttle valve 106 are provided. Note that, the throttle valve 106 is located downstream of the intake pipe 110 with respect to the air flow sensor 104, and is operated by the drive of a motor 105. Moreover, on the surge tank 109, an intake pipe pressure sensor 108 for detecting an intake air pressure in the tank is provided.

A fuel injection valve 112 provided close to an intake port of each of the cylinders of the engine 101 supplies the engine 101 with a fuel. The supplied fuel is mixed with the supplied air to form an air-fuel mixture, and the air-fuel mixture is taken into a combustion chamber of each of the cylinders of the engine 101. Moreover, the air-fuel mixture taken into the combustion chamber is combusted by being ignited by an ignition plug (not shown). Then, a combustion gas generated by the combustion passes through an exhaust pipe 114, and, after toxic gases are purified by a catalyst device (not shown), is exhausted to the atmosphere.

Moreover, in the engine 101, a water temperature sensor (not shown) for detecting a cooling water temperature of the engine 101 and a crank angle sensor 113 for detecting the crank angle of the engine 101 are provided. Note that, the crank angle sensor 113 according to the first embodiment is a specific example of a crank angle detection unit for detecting the crank angle of the engine 101.

A description is now given of the internal combustion engine automatic stop/restart device according to the first embodiment. The internal combustion engine automatic stop/restart device includes the starter 200 and an engine control unit 300 (hereinafter referred to as "ECU 300").

The starter 200 includes a pinion gear 201, a solenoid 202, a plunger 203, and a starter motor 204. Moreover, the starter motor 204 is connected to a battery 400 via a wire having a contact which is turned on by an operation of the plunger 203.

On this occasion, the starter 200 and a ring gear 115 coupled to a crankshaft of the engine 101 are provided in the engine 101. Then, when the engine 101 is started or restarted, the engine 101 is cranked by the starter 200 and the ring gear 115.

Specifically, when the engine 101 starts or restarts, power supply to the solenoid 202 starts based on a drive signal output by the ECU 300 described later, and a motion of the plunger 203 starts to push the pinion gear 201. Then, after the pinion gear 201 and the ring gear 115 come into abutment against each other, the contact on the wire between the battery 400 and the starter motor 204 turns on to start rotational drive of the starter motor 204. Then, the pinion gear 201 and the ring gear 115 securely mesh with each other, and the cranking of the engine 101 starts.

Moreover, the ECU 300 described later calculates the crank angle, a crank counter CRK, the RPM NE of the engine 101, and the like based on the output signal of the crank angle sensor 113 provided to the engine 101.

The ECU 300 includes an input/output interface 301, a CPU (microprocessor) 302, a read only memory (ROM) 303, a random access memory (RAM) 304, and a drive circuit 305.

The output signals from the above-mentioned various sensors, and detection signals such as a depressed amount of an accelerator pedal (not shown) and a depressed amount of a brake (not shown) are input to the input/output interface 301.

The CPU 302 reads a control program and various constants stored in the ROM 303 described later, carries out control calculation, and outputs a calculation (determination) result to the RAM 304 and the input/output interface 301 described later.

Moreover, the CPU 302 determines whether or not an automatic stop requirement and a restart requirement according to the present invention are satisfied, and carries out control calculation (such as the calculation of the RPM NE of the engine 101) based on the output signal from the crank angle sensor 113.

In the ROM 303, the control program, the various constants, and the like used by the CPU 302 for calculation are stored. Moreover, in the RAM 304, the calculation result by the CPU 302 is temporarily stored. Moreover, the drive circuit 305 outputs drive signals to the fuel injection valve 112, the starter 200, and the like based on the calculation result input from the CPU 302.

Figure 2:
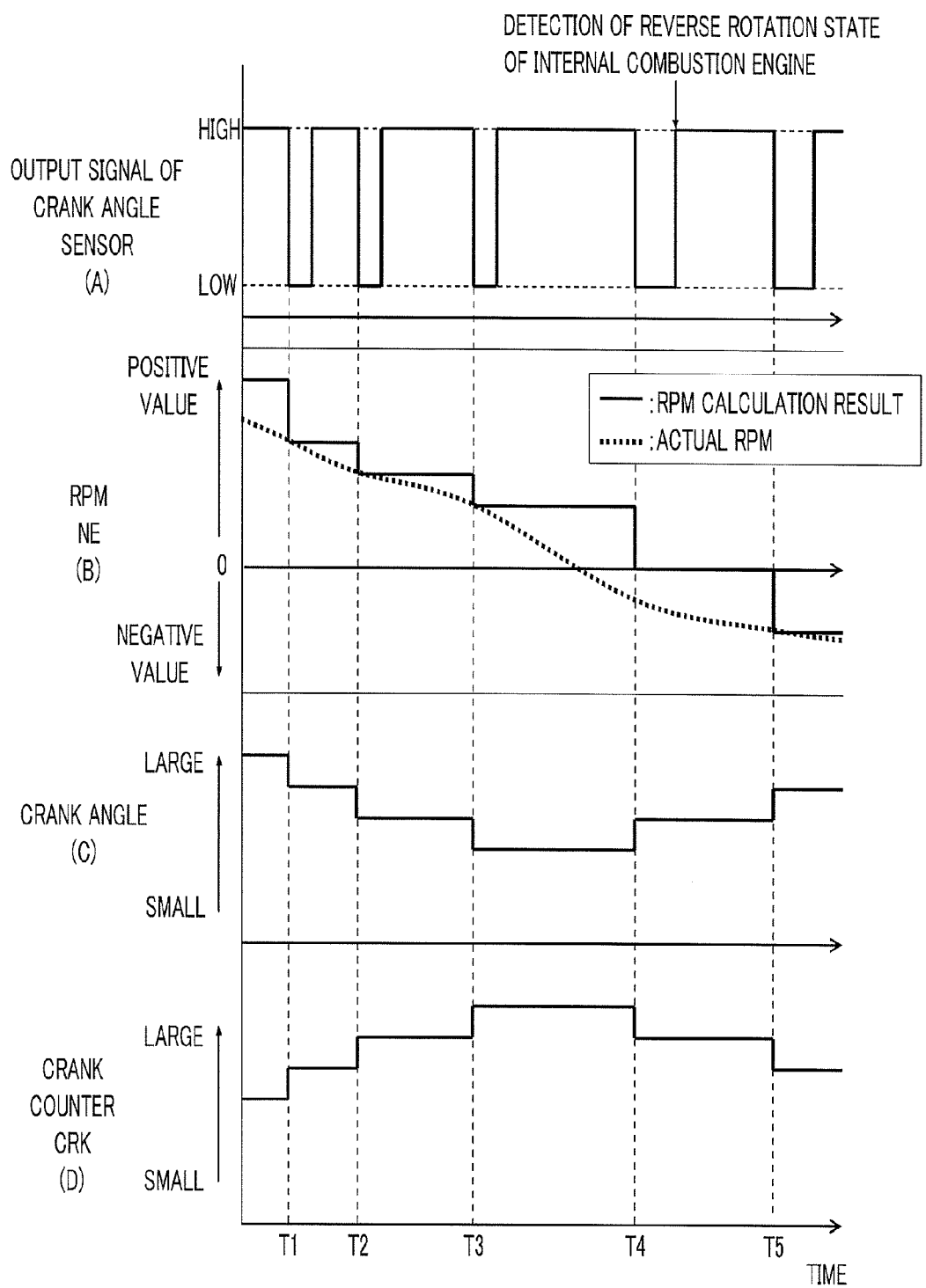
FIG. 2 is an explanatory diagram in a case where a crank angle, a crank counter, and an RPM of an engine are calculated based on an output signal of a crank angle sensor according to the first embodiment of the present invention.

Referring to FIG. 2, a description is now given of the crank angle, the crank counter CRK, and the RPM NE of the engine 101 calculated by the ECU 300 based on the output signal of the crank angle sensor 113. FIG. 2 is an explanatory diagram of a case where the crank angle, the crank counter CRK, and the RPM NE of the engine 101 are calculated based on the output signal of the crank angle sensor 113 according to the first embodiment of the present invention.

FIG. 2 shows temporal changes in the output signal (A) of the crank angle sensor 113, the RPM NE (B), the crank angle (C), and the crank counter CRK (D). Note that, regarding illustration of the RPM NE (B), a solid line represents the calculated RPM NE (RPM calculation result) by the ECU 300 and a dotted line represents the actual RPM of the internal combustion engine. Moreover, the RPM during the reverse rotation of the internal combustion engine is represented by a negative number for the sake of convenience.

On this occasion, the output signal of the crank angle sensor 113 according to the first embodiment changes depending on whether the rotation state of the engine 101 is the forward rotation state or the reverse rotation state. Thus, the rotation state of the engine 101 can be accurately detected. Moreover, the various calculated values calculated by the ECU 300 based on the output signal of the crank angle sensor 113 behave as shown in FIG. 2.

Moreover, each time the output signal of the crank angle sensor 113 is input to the ECU 300, the RPM NE of the engine 101 and the like are calculated. Specifically, the calculation of the RPM NE of the engine 101, the crank angle, and the crank counter CRK is carried out at a fall time point (a time point at a change from a HIGH value to a LOW value) of the output signal of the crank angle sensor 113.

It is determined that, if a LOW period which is a total period when the output signal of the crank angle sensor 113 can take the LOW value in each cycle is short, the rotation state of the engine 101 is the forward rotation state, and if the LOW period is long, the rotation state of the engine 101 is the reverse rotation state. Moreover, the output signal of the crank angle sensor 113 is output at each predetermined angle (such as ten degrees) between crank angles. The determination of the rotation state of the engine 101 is carried out by a rotation direction determination unit stored in the ROM 303 in the ECU 300. In other words, the rotation direction determination unit determines whether the crank signal output by the crank angle sensor 113 is a forward rotation crank signal corresponding to a case where the rotation state of the engine 101 is the forward rotation state or the reverse rotation crank signal corresponding to a case where the rotation state is the reverse rotation state.

Moreover, the RPM NE of the engine 101 is calculated from Equation (1) below by using a time interval between a currently-input time point (T(n)) which is a time point when the output signal of the crank angle sensor 113 is currently input and a previously-input time point (T(n−1)) which is a time point when the output signal is previously input, and the predetermined angle (such as ten degrees) between the crank angles. The calculation of the RPM NE of the engine 101 is carried out by an RPM calculation unit stored in the ROM 303 in the ECU 300.

$$\text{RPM NE}[r/min] = 60/(T(n)-T(n-1)) \times (\text{predetermined angle between crank angles})/360 \quad (1)$$

Moreover, the crank angle is calculated so that the compression top dead center of each of the cylinders of the engine 101 is assumed as a reference (0 degrees), and the crank angle takes a maximum value after the compression top dead center.

Moreover, the crank counter CRK is incremented until the crankshaft of the engine 101 rotates twice (intake, compression, combustion, and exhaust strokes). In other words, the crank counter CRK is calculated so as to take the maximum value before the top dead center in the compression stroke after two rotations, and to return to zero at the top dead center when the top dead center in the compression stroke of a first cylinder of the engine 101 is assumed as a reference (=0).

As shown in FIG. 2, the ECU 300 determines that the rotation state of the engine 101 is the forward rotation state based on the output signal of the crank angle sensor 113 (hereinafter referred to "crank signal" as needed) in a period from the time point T1 to the time point T3. Moreover, the time interval between the crank signals of the forward rotation crank signals (crank signals corresponding to the forward rotation) output by the crank angle sensor 113 gradually extends from the time point T1 to the time point T3, and the RPM NE of the engine 101 thus decreases. Moreover, the crank angle is subtracted by the predetermined angle each time, and the crank counter CRK is added by a predetermined value each time.

After the time point T4, the LOW period in the output signal of the crank angle sensor 113 extends, and the ECU 300 thus determines that the rotation state of the engine 101 is the reverse rotation state. Moreover, the output signal of the crank angle sensor 113 detected at the time point T4 is the first reverse rotation crank signal (a crank signal corresponding to the first reverse rotation), and the RPM NE of the engine 101 is thus set to 0. Similarly, the crank angle is added by the predetermined angle, and the crank counter CRK is subtracted by the predetermined value.

Note that, a reason for assuming the RPM NE of the engine 101 as 0 at the time point T4 is as described below. Specifically, the rotation state of the engine 101 is the reverse rotation state at the time point T4, and hence the RPM NE actually needs to be not zero but a negative value.

However, the rotation state of the engine 101 changes from the forward rotation state to the reverse rotation state in the period from the time point T3 to the time point T4, and thus, as shown in FIG. 2, the actual RPM becomes 0 temporarily. Moreover, the crank angle sensor 113 outputs the signal in accordance with the rotation state of the crankshaft, and cannot output the signal in a state where the actual RPM is zero. Thus, a time point when the actual RPM is 0 cannot be determined based on the output signal of the crank angle sensor 113, and thus the time point T4 is assumed as the start time point of the reverse rotation of the engine 101, and the RPM NE is set to 0.

When the second reverse rotation crank signal is output from the crank angle sensor 113 at the time point T5, a negative RPM NE (namely, the RPM NE when the rotation state of the engine 101 is the reverse rotation state) is calculated for the first time. Moreover, the crank angle is added by the predetermined angle, and the crank counter CRK is subtracted by the predetermined value.

After the rotation state of the engine 101 changes from the reverse rotation state to the forward rotation state, when the crank angle sensor 113 outputs an output signal corresponding to a first forward rotation, similarly, the RPM NE of the engine 101 is assumed to be 0. Moreover, the crank angle is subtracted by the predetermined angle, and the crank counter CRK is added by the predetermined value.

In this way, the ECU 300 accurately determines the rotation state of the engine 101 based on the output signal of the crank angle sensor 113, and even when the rotation state changes, the crank angle of the engine 101 and the crank counter CRK can be accurately calculated.

Figure 3:
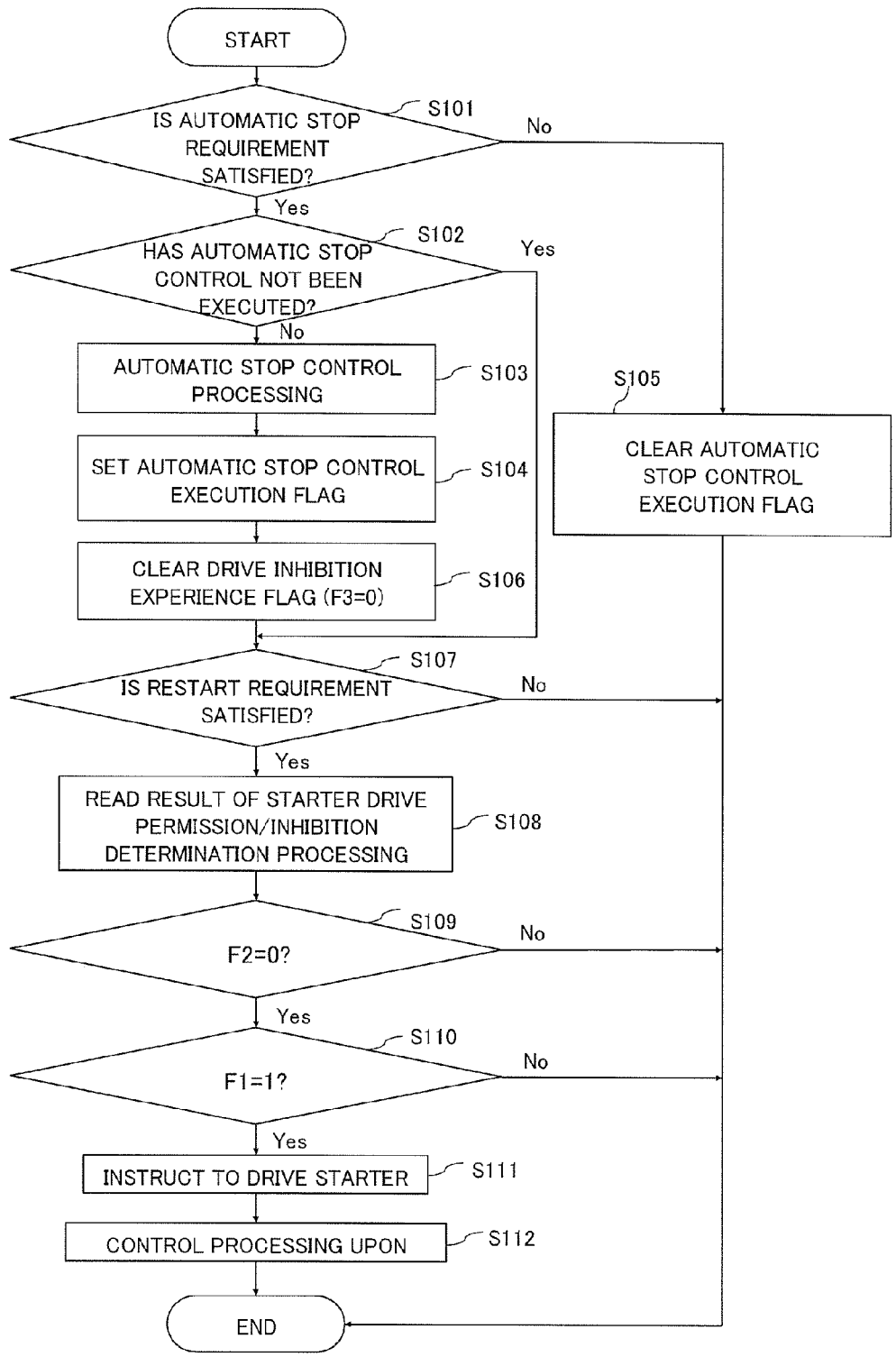
FIG. 3 is a flowchart illustrating automatic stop/restart processing for the engine executed by the internal combustion engine automatic stop/restart device according to the first embodiment of the present invention.
Figure 4A:
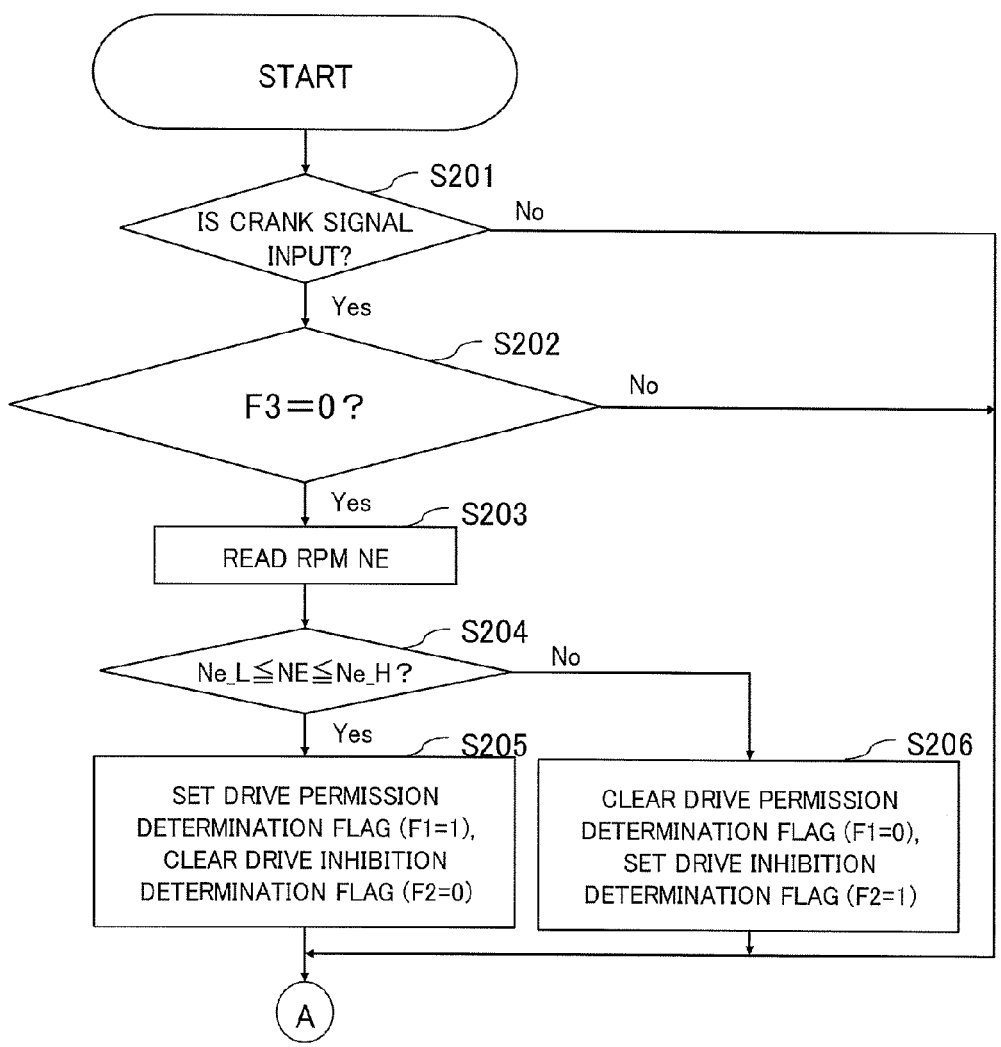
FIG. 4A is a flowchart illustrating drive permission/drive inhibition determination processing for a starter executed by the internal combustion engine automatic stop/restart device according to the first embodiment of the present invention.
Figure 4B:
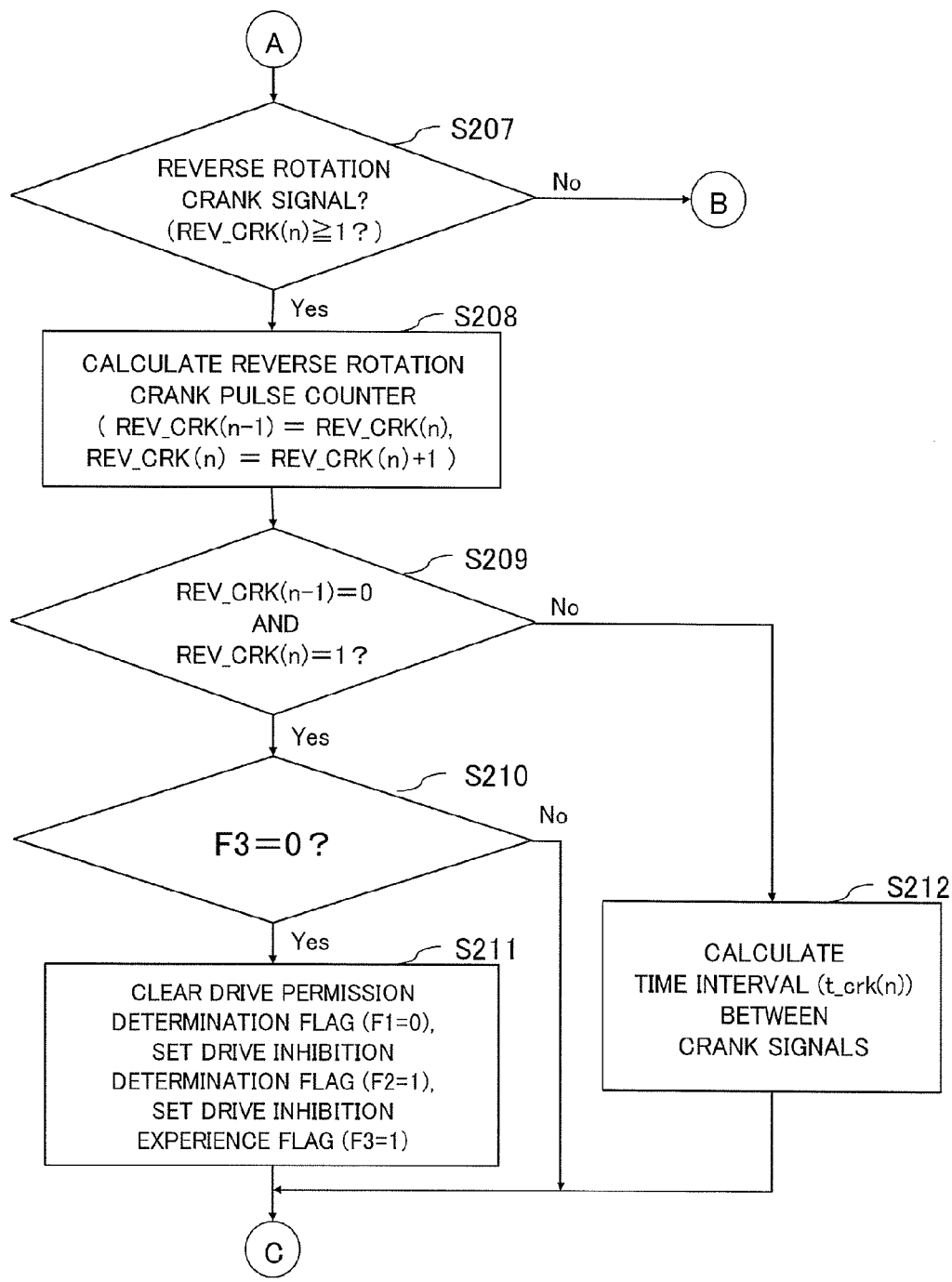
FIG. 4B is a flowchart illustrating the drive permission/drive inhibition determination processing for the starter executed by the internal combustion engine automatic stop/restart device according to the first embodiment of the present invention.

Referring to flowcharts of FIGS. 3 and 4A to 4C, a description is now given of a series of an operation procedure of the internal combustion engine automatic stop/restart device according to the first embodiment. FIG. 3 is a flowchart illustrating automatic stop/restart processing for the engine 101 that is executed by the internal combustion engine automatic stop/restart device according to the first embodiment of the present invention. FIGS. 4A to 4C are flowcharts illustrating drive permission/drive inhibition determination processing for the starter 200 that is executed by the internal combustion engine automatic stop/restart device according to the first embodiment of the present invention. It should be noted that FIGS. 4A to 4C are one flowchart, which is divided on three drawing sheets, and hence a portion illustrated in FIG. 4A, a portion illustrated in FIG. 4B, and a portion illustrated in FIG. 4C are continuous.

First, a description is given of the flowchart of FIG. 3. A series of processing in the flowchart of FIG. 3 is calculated (executed) by the ECU 300 in the internal combustion engine automatic stop/restart device for each processing cycle (such as 10 millisecond cycle).

First, in Step S101, the ECU 300 determines whether or not the automatic stop requirement is satisfied. Specifically, it is determined whether or not the automatic stop requirement is satisfied based on various types of information for determining an intention of a driver to decelerate or stop.

Specific examples of the above-mentioned various types of information include (1) whether or not a detected temperature of the water temperature sensor is equal to or more than a predetermined temperature (such as 60 degrees), (2) whether or not a vehicle speed equal to or higher than a predetermined speed (such as 12 km/h) has been detected once or more, (3) whether or not a current vehicle speed is equal to or less than a predetermined speed (such as 0 km/h), (4) whether or not a brake pedal is depressed, and (5) whether or not the depressed amount of the accelerator pedal is equal to or less than a predetermine value (such as no depressed amount).

Then, if the ECU 300 determines in Step S101 that the automatic stop requirement is not satisfied (namely, No), the ECU 300 proceeds to Step S105, clears an automatic stop control execution flag described later, finishes the series of processing, and proceeds to next processing.

On the other hand, if the ECU 300 determines in Step S101 that the automatic stop requirement is satisfied (namely, Yes), the ECU 300 proceeds to Step S102, and determines whether or not the automatic stop control has not been executed. Specifically, it is determined whether or not the automatic stop control has not been executed based on whether or not the automatic stop control execution flag described later is set.

Then, if the ECU 300 determines in Step S102 that the automatic stop control has not been executed (namely, No), the ECU 300 proceeds to Step S103, and executes automatic stop control processing. Specifically, in Step S103, the ECU 300 stops the drive signal to the fuel injection valve 112, and stops the fuel supply to the engine 101. Moreover, the ECU 300, for example, additionally carries out control such as a change in a control amount of the throttle valve 106 and release of a clutch of a transmission mounted to the engine 101.

Then, in Step S104, the ECU 300 sets the automatic stop control execution flag, and proceeds to Step S106. Then, in Step S106, the ECU 300 clears a drive inhibition experience flag F3 (F3=0), and proceeds to Step S107. A detailed description is later given of the drive inhibition experience flag F3.

On the other hand, if the ECU 300 determines in Step S102 that the automatic stop control has been executed (namely, Yes), the ECU 300 proceeds to Step S107. Specifically, if the ECU 300 executes the processing in Step S102 for the first time after the automatic stop requirement is satisfied, the ECU 300 has not executed the automatic stop control yet. Thus, the ECU 300 determines in Step S102 that the automatic stop control has not been executed, and proceeds to Step S103.

Moreover, if the ECU 300 executes the processing in Step S102 for the second or subsequent time after the automatic stop requirement is satisfied, the ECU 300 has already executed the automatic stop control. Thus, the ECU 300 determines in Step S102 that the automatic stop control has been carried out, and proceeds to Step S107.

Then, in Step S107, the ECU 300 determines whether or not the restart requirement is satisfied. Specifically, it is determined whether or not the restart requirement is satisfied based on various types of information for determining an intention of the driver of a start or acceleration operation, information indicating a state of the battery 400 for supplying electric power to various types of sensor such as the intake air temperature sensor 103 provided to the engine 101 and the like, and other such information.

Specific examples of the above-mentioned various types of information include (1) whether or not the depressed amount of the brake pedal is equal to or less than a predetermined value (such as no depressed amount), and (2) whether or not the depressed amount of the accelerator pedal is equal to or more than a predetermined value (such as a depressed amount of equal to or more than 10% of the depressed amount).

Then, if the ECU 300 determines in Step S107 that the restart requirement is not satisfied (namely, No), the ECU 300 stops the series of processing, and proceeds to next processing.

On the other hand, if the ECU 300 determines in Step S107 that the restart requirement is satisfied (namely, Yes), the ECU 300 proceeds to Step S108. Then, in Step S108, the ECU 300 reads a result of the drive permission/drive inhibition determination processing for the starter 200, and proceeds to Step S109. Note that, a detailed description is later given of the drive permission/drive inhibition determination processing for the starter 200.

Then, in Step S109, the ECU 300 determines whether or not a drive inhibition determination flag F2 read in Step S108 is "0". Then, if the ECU 300 determines in Step S109 that the drive inhibition determination flag F2 is "1" (namely, No), the ECU 300 stops the series of processing, and proceeds to next processing.

On the other hand, if the ECU 300 determines in Step S109 that the drive inhibition determination flag F2 is "0" (namely, Yes), the ECU 300 proceeds to Step S110.

Then, in Step S110, the ECU 300 determines whether or not a drive permission determination flag F1 read in Step S108 is "1". Then, if the ECU 300 determines in Step S110 that the drive permission determination flag F1 is "0" (namely, No), the ECU 300 stops the series of processing, and proceeds to next processing.

On the other hand, if the ECU 300 determines in Step S110 that the drive permission determination flag F1 is "1" (namely, Yes), the ECU 300 proceeds to Step S111.

Then, in Step S111, the starter 200 is in a drivable state, and hence the ECU 300 issues a drive instruction to the starter 200 to start the cranking of the engine 101, and proceeds to Step S112.

Then, in Step S112, the ECU 300 executes control processing upon restart, finishes the series of processing, and proceeds to next processing. Specifically, the ECU 300 outputs the drive signal to the fuel injection valve 112 to restart the fuel injection in Step S112. Further, the ECU 300 executes, for example, control to change the control amount of the throttle valve 106 to a control amount for the restart.

The processing in Steps S101 to S106 is executed by an automatic stop control unit stored in the ROM 303 in the ECU 300. Moreover, the processing in Steps S107 to S112 is executed by a restart control unit stored in the ROM 303 in the ECU 300.

A description is now given of the flowcharts of FIGS. 4A to 4C. A series of processing in the flowcharts of FIGS. 4A to 4C is calculated (executed) by the ECU 300 in the internal combustion engine automatic stop/restart device for each processing cycle (such as 2.5 millisecond cycle) shorter than a processing cycle of the flowchart of FIG. 3 above.

Moreover, as described above, a result (calculation result) of the drive permission/drive inhibition determination processing for the starter 200 is read in the case where Step S108 is carried out for processing in the flowchart of FIG. 3 above. Further, as described below, processing in Steps S201 to S206 corresponds to processing for drive permission determination for the starter 200, and processing in Steps S207 to S225 corresponds to processing for drive inhibition determination and processing for drive inhibition release for the starter 200.

First, in Step S201, the ECU 300 determines whether or not the crank signal is input from the crank angle sensor 113. Then, if the ECU 300 determines in Step S201 that the crank signal is not input (namely, No), the ECU 300 proceeds to Step S207.

On the other hand, if the ECU 300 determines in Step S201 that the crank signal is input (namely, Yes), the ECU 300 proceeds to Step S202, and determines whether or not the drive inhibition experience flag F3 is "0". Note that, the drive inhibition experience flag F3 is a flag to be set only if the drive inhibition determination flag F2 is set after the reverse rotation crank signal is input, and is information used to make the drive inhibition determination only once during the reverse rotation of the engine 101.

Then, if the ECU 300 determines in Step S202 that the drive inhibition experience flag F3 is "1" (namely, No), the ECU 300 proceeds to Step S207. On the other hand, if the ECU 300 determines in Step S202 that the drive inhibition experience flag F3 is "0" (namely, Yes), the ECU 300 proceeds to Step S203. Note that, the drive inhibition experience flag F3 is "0" during the forward rotation of the engine 101.

Then, in Step S203, the ECU 300 reads the RPM NE of the engine 101, proceeds to S204, and makes drive permission determination for the starter 200. Specifically, the ECU 300 determines whether or not the RPM NE of the engine 101 is included in a drivable RPM range from a starter drivable RPM lower limit value Ne_L (such as −60 r/min) to a starter drivable RPM upper limit value Ne_H (such as 80 r/min) of the starter 200.

On this occasion, as described above, in the starter 200, when the pinion gear 201 meshes with the ring gear 115 and the contact is turned on, the power supply to the starter motor 204 starts and the rotational drive starts. Therefore, when the engine 101 is started or restarted, the pinion gear 201 of the starter 200 meshes with the ring gear 115 of the engine 101 in a non-rotation state. Moreover, it is difficult for the pinion gear 201 to mesh with the ring gear 115 depending on the RPM NE of the engine 101. Thus, in Step S204, it is determined whether or not the RPM NE of the engine 101 is included in the drivable RPM range in which the pinion gear 201 can mesh with the ring gear 115.

Moreover, the ring gear 115 of the engine 101 is coupled to the crankshaft of the engine 101, and the RPM of the ring gear 115 is thus equal to the RPM NE of the engine 101. Therefore, based on the RPM NE of the engine 101, the drive permission determination for the starter 200 is made.

Then, if the ECU 300 determines in Step S204 that the RPM NE of the engine 101 is included in the drivable RPM range (namely, Yes), the ECU 300 proceeds to Step S205. Then, in Step S205, the ECU 300 sets the drive permission determination flag F1 (F1=1), simultaneously clears the drive inhibition determination flag F2 (F2=0), and proceeds to Step S207. Note that, in the first embodiment, setting a flag means setting "1" to the flag, and clearing a flag means setting "0" to the flag.

On the other hand, if the ECU 300 determines in Step S204 that the RPM NE of the engine 101 is not included in the drivable RPM range (namely, No), the ECU 300 proceeds to Step S206. Then, in Step S206, the ECU 300 clears the drive permission determination flag F1 (F1=0), simultaneously sets the drive inhibition determination flag F2 (F2=1), and proceeds to Step S207.

Then, in Step S207, the ECU 300 determines whether or not the input crank signal is the reverse rotation crank signal. Note that, the ECU 300 may determine whether or not the input crank signal is the reverse rotation crank signal by determining whether or not a reverse rotation crank pulse counter REV_CRK(n) is equal to or more than 1. In other words, if the reverse rotation crank pulse counter REV_CRK(n) is equal to or more than 1, the input crank signal is determined to be the reverse rotation crank signal. Moreover, if the reverse rotation crank pulse counter REV_CRK(n) is 0, the input crank signal is determined to be the forward rotation crank signal.

On this occasion, the reverse rotation crank pulse counter REV_CRK(n) is information which has 0 as an initial value, and is counted up for the first time when the reverse rotation crank signal is input. Moreover, when the rotation state of the engine 101 is the forward rotation state (in other words, when the input crank signal is determined not to be the reverse rotation crank signal), the reverse rotation crank pulse counter REV_CRK(n) is not counted up.

Then, if the ECU 300 determines in Step S207 that the input crank signal is not the reverse rotation crank signal (namely, No), the ECU 300 proceeds to Step S225. Moreover, in Step S225, the ECU 300 clears the reverse rotation crank pulse counter REV_CRK(n−1) at last processing and the reverse rotation crank pulse counter REV_CRK(n) at the current processing to set both thereof to zero, finishes the series of processing, and proceeds to next processing.

Note that, the reverse rotation crank pulse counter REV_CRK(n) at the current processing is hereinafter simply referred to as "reverse rotation crank pulse counter REV_CRK(n)", and the reverse rotation crank pulse counter REV_CRK(n−1) at the last processing is hereinafter simply referred to as "reverse rotation crank pulse counter REV_CRK(n−1)". On the other hand, if the ECU 300 determines in Step S207 that the input crank signal is the reverse rotation crank signal (namely, Yes), the ECU 300 proceeds to Step S208.

Then, in Step S208, the ECU 300 carries out calculation for the reverse rotation crank pulse counter REV_CRK(n), and proceeds to Step S209. Specifically, the ECU 300 replaces the reverse rotation crank pulse counter REV_CRK(n−1) by the reverse rotation crank pulse counter REV_CRK(n) (REV_CRK(n−1)=REV_CRK(n)). Further, the ECU 300 counts up the reverse rotation crank pulse counter REV_CRK(n) by 1 (REV_CRK(n)=REV_CRK(n)+1)).

Then, in Step S209, the ECU 300 determines whether or not the input crank signal is a first reverse rotation crank signal. Specifically, if the reverse rotation crank pulse counter REV_CRK(n−1) is 0 and the reverse rotation crank pulse counter REV_CRK(n) is 1, the ECU 300 determines that the input crank signal is the first reverse rotation crank signal. On the other hand, if the reverse rotation crank pulse counter REV_CRK(n−1) is not 0, or the reverse rotation crank pulse counter REV_CRK(n) is not 1, the ECU 300 determines that the input crank signal is not the first reverse rotation crank signal.

Then, if the ECU 300 determines in Step S209 that the input crank signal is not the first reverse rotation crank signal (namely, No), the ECU 300 proceeds to Step S212. Note that, if a second or subsequent reverse rotation crank signal is input, the input crank signal is determined not to be the first reverse rotation crank signal.

Then, in Step S212, the ECU 300 calculates a time interval t_crk(n) between the crank signals based on an input time point when the last reverse rotation crank signal is input and an input time point when the second last reverse rotation crank signal is input, and proceeds to Step S213. Note that, as described above, the time point when the first reverse rotation crank signal is input is a reverse rotation start time point, and hence when the second reverse rotation crank signal is input, the time interval t_crk(n) between the crank signals is calculated for the first time.

On the other hand, if the ECU 300 determines in Step S209 that the input crank signal is the first reverse rotation crank signal (namely, Yes), the ECU 300 proceeds to Step S210, and determines whether or not the drive inhibition experience flag F3 is "0".

Then, if the ECU 300 determines in Step S210 that the drive inhibition experience flag F3 is "1" (namely, No), the ECU 300 proceeds to Step S213. Specifically, if the reverse rotation crank pulse counter REV_CRK(n) is 1, and the calculation in Step S210 is carried out for the second or subsequent times, the drive inhibition experience flag F3 is "1".

On the other hand, if the ECU 300 determines in Step S210 that the drive inhibition experience flag F3 is "0" (namely, Yes), the ECU 300 proceeds to Step S211. Specifically, if the calculation in Step S210 is carried out for the first time (in other words, if the input crank signal is the first reverse rotation crank signal), the drive inhibition experience flag F3 is "0".

Then, in Step S211, the ECU 300 clears the drive permission determination flag F1 (F1=0), sets the drive inhibition determination flag F2 (F2=1), sets the drive inhibition experience flag F3 (F3=1), and proceeds to Step S213.

Then, in Step S213, the ECU 300 determines whether or not the reverse rotation crank pulse counter REV_CRK(n) is 2. Then, if the ECU 300 determines in Step S213 that the reverse rotation crank pulse counter REV_CRK(n) is not 2 (namely, No), the ECU 300 proceeds to Step S219.

Specifically, if the input crank signal is the first reverse rotation crank signal, the reverse rotation crank pulse counter REV_CRK(n) is 1, and the reverse rotation crank pulse counter REV_CRK(n) is thus determined not to be 2.

On the other hand, if the ECU 300 determines in Step S213 that the reverse rotation crank pulse counter REV_CRK(n) is 2 (namely, Yes), the ECU 300 proceeds to Step S214.

Specifically, if the input crank signal is the second reverse rotation crank signal, the reverse rotation crank pulse counter REV_CRK(n) is 2, and the reverse rotation crank pulse counter REV_CRK(n) is thus determined to be 2.

Then, in Step S214, the ECU 300 counts up a measurement timer, and proceeds to Step S215. Note that, the measurement timer is a timer counted up after the second reverse rotation crank signal is input, and, specifically, measures an elapsed time t_ct from the time point when the second reverse rotation crank signal is input. Note that, the elapsed time t_ct from the time point when the second reverse rotation crank signal is input measured by the measurement timer is hereinafter referred to as "timer-measured period t_ct".

Then, in Step S215, the ECU 300 determines whether or not the time interval t_crk(n) between the crank signals calculated in Step S212 is longer than a drive permission lower limit value corresponding period T_l.

Note that, the drive permission lower limit value corresponding period T_l is set based on the drivable RPM of the starter 200, and is stored in the ROM 303 of the ECU 300 in advance. Specifically, the drive permission lower limit value corresponding period T_l is set, by using a rotation angle (predetermined angle between crank angles) for each crank signal, from a value in time converted from the drivable RPM of the starter 200. For example, when the starter drivable RPM lower limit value Ne_L of the starter 200 is −60 r/min, and the rotation angle for each crank signal is 10 degrees, the drive permission lower limit value corresponding period T_l is approximately 28 milliseconds.

Then, if the ECU 300 determines in Step S215 that the time interval t_crk(n) between the crank signals is longer than the drive permission lower limit value corresponding period T_l (namely, Yes), the ECU 300 proceeds to Step S216.

Then, in Step S216, the ECU 300 determines whether or not the timer-measured period t_ct is equal to or longer than the time interval t_crk(n) between the crank signals.

Then, if the ECU 300 determines in Step S216 that the timer-measured period t_ct is equal to or longer than the time interval t_crk(n) between the crank signals (namely, Yes), the ECU 300 proceeds to Step S218. On the other hand, if the ECU 300 determines in Step S216 that the timer-measured period t_ct is shorter than the time interval t_crk(n) between the crank signals (namely, No), the ECU 300 finishes the series of processing, and proceeds to next processing.

Moreover, if the ECU 300 determines in Step S215 that the time interval t_crk(n) between the crank signals is equal to or shorter than the drive permission lower limit value corresponding period T_1 (namely, No), the ECU 300 proceeds to Step S217.

Then, in Step S217, the ECU 300 determines whether or not the timer-measured period t_ct is longer than the drive permission lower limit value corresponding period T_1.

Then, if the ECU 300 determines in Step S217 that the timer-measured period t_ct is longer than the drive permission lower limit value corresponding period T_1 (namely, Yes), the ECU 300 proceeds to Step S218. On the other hand, if the ECU 300 determines in Step S217 that the timer-measured period t_ct is equal to or shorter than the drive permission lower limit value corresponding period T_1 (namely, No), the ECU 300 finishes the series of processing, and proceeds to next processing.

Then, in Step S218, the ECU 300 sets the drive permission determination flag F1 (F1=1), clears the drive inhibition determination flag F2 (F2=0), clears the measurement timer (t_ct=0), finishes the series of processing, and proceeds to next processing.

On the other hand, if the ECU 300 determines in Step S213 that the reverse rotation crank pulse counter REV_CRK(n) is not 2 (namely, No), the ECU 300 proceeds to Step S219, and determines whether or not the reverse rotation crank pulse counter REV_CRK(n) is equal to or more than 3. Then, if the ECU 300 determines in Step S219 that the reverse rotation crank pulse counter REV_CRK(n) is equal to or more than 3 (namely, Yes), the ECU 300 proceeds to Step S220.

Then, in Step S220, the ECU 300 determines whether or not the time interval t_crk(n) between the crank signals is longer than a time interval t_crk(n−1) between the crank signals. Note that, the time interval t_crk(n−1) between the crank signals is a time interval calculated last time before the time interval t_crk(n) between the crank signals is calculated.

Then, if the ECU 300 determines in Step S220 that the time interval t_crk(n) between the crank signals is equal to or shorter than the time interval t_crk(n−1) between the crank signals (namely, No), the ECU 300 finishes the series of processing, and proceeds to next processing.

On the other hand, if the ECU 300 determines in Step S220 that the time interval t_crk(n) between the crank signals is longer than the time interval t_crk(n−1) between the crank signals (namely, Yes), the ECU 300 proceeds to Step S221.

Then, in Step S221, the ECU 300 determines whether or not the time interval t_crk(n) between the crank signals is equal to or longer than the drive permission lower limit value corresponding period T_1. Then, if the ECU 300 determines in Step S221 that the time interval t_crk(n) between the crank signals is shorter than the drive permission lower limit value corresponding period T_1 (namely, No), the ECU 300 finishes the series of processing, and proceeds to next processing.

On the other hand, if the ECU 300 determines in Step S221 that the time interval t_crk(n) between the crank signals is equal to or longer than the drive permission lower limit value corresponding period T_1 (namely, Yes), the ECU 300 proceeds to Step S222.

Then, in Step S222, the ECU 300 sets the drive permission determination flag F1 (F1=1), clears the drive inhibition determination flag F2 (F2=0), clears the measurement timer (t_ct=0), finishes the series of processing, and proceeds to next processing.

On the other hand, if the ECU 300 determines in Step S219 that the reverse rotation crank pulse counter REV_CRK(n) is less than 3 (namely, No), the ECU 300 proceeds to Step S223, and determines whether or not the internal combustion engine (engine 101) is stopped. Specifically, if the reverse rotation crank pulse counter REV_CRK(n) is 1 (in other words, if the input crank signal is the first reverse rotation crank signal), Step S223 is carried out.

Then, if the ECU 300 determines in Step S223 that the engine 101 is not stopped (namely, No), the ECU 300 finishes the series of processing, and proceeds to next processing. Note that, in this case, the drive inhibition state of the starter 200 continues.

On the other hand, if the ECU 300 determines in Step S223 that the engine 101 is stopped (namely, Yes), the ECU 300 proceeds to Step S224.

Then, in Step S224, the ECU 300 sets the drive permission determination flag F1 (F1=1), clears the drive inhibition determination flag F2 (F2=0), clears the measurement timer (t_ct=0), finishes the series of processing, and proceeds to next processing.

Note that, the processing in Steps S201 to S206 is executed by a drive permission determination unit stored in the ROM 303 in the ECU 300. Moreover, the processing in Steps S207 to S211 is executed by a drive inhibition determination unit stored in the ROM 303 in the ECU 300. Further, the processing in Steps S212 to S225 is executed by a drive inhibition release unit stored in the ROM 303 in the ECU 300.

Figure 6:
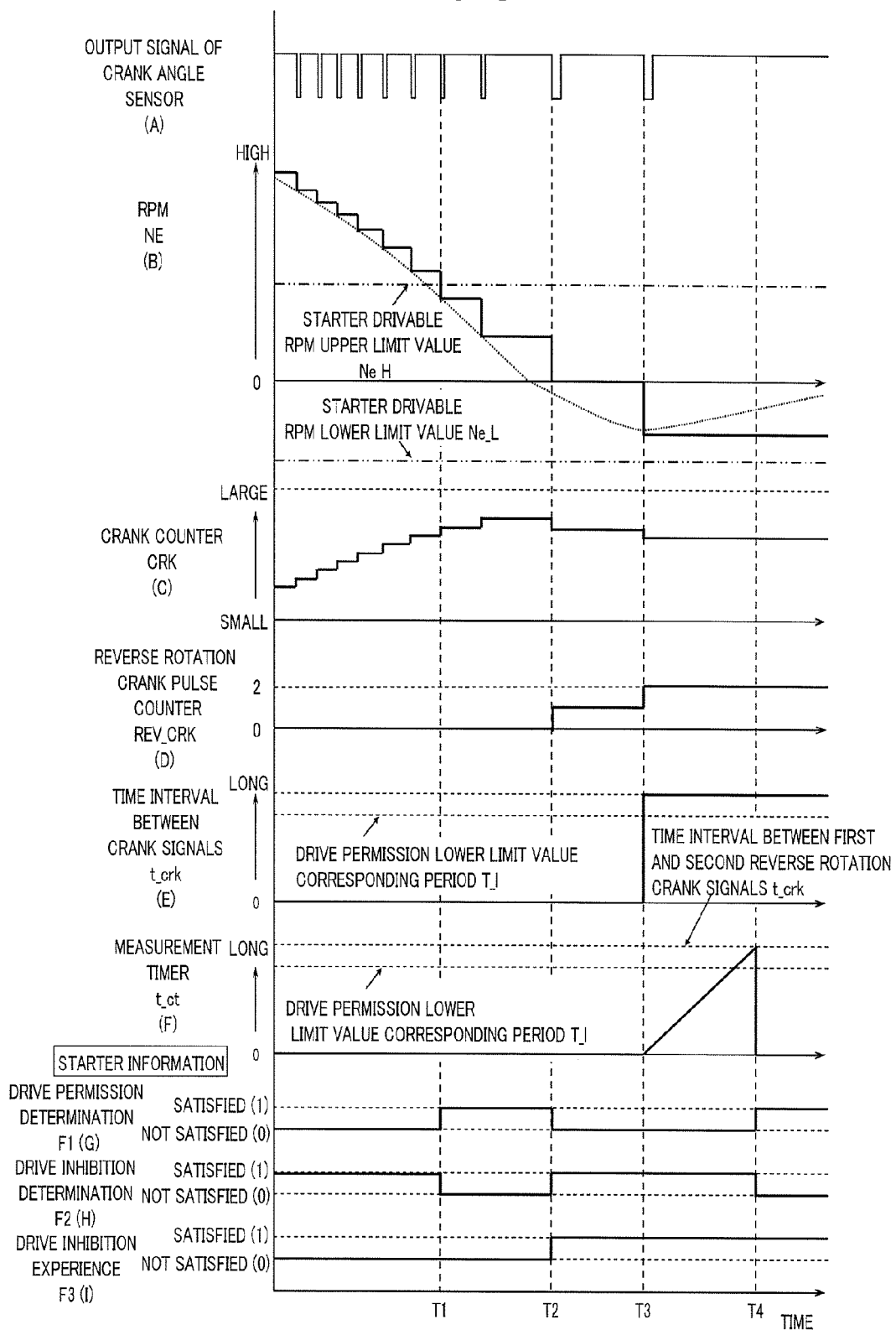
FIG. 6 is an explanatory diagram showing another example of operations carried out at respective time points by the internal combustion engine automatic stop/restart device according to the first embodiment.

Then, referring to timing charts of FIGS. 5 and 6, a description is given of operations carried out at respective time points by the internal combustion engine automatic stop/restart device according to the first embodiment. FIG. 5 is an explanatory diagram showing an example of operations carried out at respective time points by the internal combustion engine automatic stop/restart device according to the first embodiment. FIG. 6 is an explanatory diagram showing another example of operations carried out at respective time points by the internal combustion engine automatic stop/restart device according to the first embodiment.

Note that, FIGS. 5 and 6 mainly show, particularly, the operation of releasing the drive inhibition state carried out for the engine 101 by the internal combustion engine automatic stop/restart device according to the first embodiment while the RPM NE of the engine 101 is decreasing during the automatic stop.

FIGS. 5 and 6 show temporal changes of the output signal of the crank angle sensor 113 (A), the RPM NE (B), the crank counter CRK (C), the reverse rotation crank pulse counter REV_CRK (D), the time interval t_crk between the crank signals (E), the timer-measured period t_ct by the measurement timer (F), the drive permission determination flag F1 (G), the drive inhibition determination flag F2 (H), and the drive inhibition experience flag F3 (I).

Note that, regarding the representation of the RPM NE (B), the solid line represents the calculated RPM NE (RPM calculation result) by the ECU 300 and the dotted line represents the actual RPM of the internal combustion engine. Moreover, the RPM during the reverse rotation of the internal combustion engine is represented by a negative value for the sake of convenience.

On this occasion, as described above, the output signal of the crank angle sensor 113 changes depending on whether the rotation state of the engine 101 is the forward rotation state or the reverse rotation state. Therefore, the various calculated values calculated by the ECU 300 behave as shown in FIGS. 5 and 6 based on the output signal of the crank angle sensor 113.

First, a description is given of the timing chart of FIG. 5. As shown in FIG. 5, before a time point T1, as time approaches the time point T1, a time interval between the crank signals on the output signal of the crank angle sensor 113 increases.

In this case, the RPM NE of the engine 101 decreases depending on the time interval, and simultaneously, the crank counter CRK is added by the predetermined value. Moreover, the rotation state of the engine 101 is the forward rotation state, and the RPM NE is not included in the drivable RPM range of the starter 200. Thus, the drive permission determination flag F1 becomes "0" and the drive inhibition determination flag F2 becomes "1", and the starter 200 is thus brought into the drive inhibition state. Moreover, the reverse rotation crank pulse counter REV_CRK and the like do not change.

At the time point T1, the RPM NE of the engine 101 reaches an RPM equal to or less than the starter drivable RPM upper limit value Ne_H. In this case, the drive permission determination flag F1 becomes "1" and the drive inhibition determination flag F2 becomes "0", and the starter 200 is thus brought into the drive permission state. When the starter 200 is brought into the drive permission state and the restart requirement is simultaneously satisfied, the starter 200 carries out the driving.

At a time point T2, the output signal of the crank angle sensor 113 becomes the first reverse rotation crank signal. In this case, the crank counter CRK is subtracted by the predetermined value, and simultaneously, the reverse rotation crank pulse counter REV_CRK (D) is counted up from 0 to 1. Moreover, the drive permission determination flag F1 becomes "0" the drive inhibition determination flag F2 becomes "1", and the starter 200 is thus brought into the drive inhibition state. Moreover, the drive inhibition experience flag F3 becomes "1". As shown in FIG. 5, after the time point T2 when the output signal of the crank angle sensor 113 becomes the first reverse rotation crank signal, the starter 200 is in the drive inhibition state.

At a time point T3, the output signal of the crank angle sensor 113 becomes the second reverse rotation crank signal. In this case, the crank counter CRK is subtracted by the predetermined value, and simultaneously, the reverse rotation crank pulse counter REV_CRK is counted up from 1 to 2. Moreover, the time interval t_crk (hereinafter referred to as "time interval t_crk(1,2)") between the crank signals, which are the first reverse rotation crank signal and the second reverse rotation crank signal, is calculated, and simultaneously, the count up of the measurement timer starts.

On this occasion, at the time point T3 when the second reverse rotation crank signal is input, the time interval t_crk (1,2) is calculated, and is compared in magnitude with the drive permission lower limit value corresponding period T_l as described above. Then, the drive inhibition release determination period is determined depending on the comparison result. Note that, in FIG. 5, the time interval t_crk(1,2) is shorter than the drive permission lower limit value corresponding period T_l, and the drive inhibition release determination period thus corresponds to the drive permission lower limit value corresponding period T_l.

At a time point T4, the elapsed time t_ct from the time point T3 measured by the measurement timer becomes equal to or longer than the drive permission lower limit value corresponding period T_l, which is the drive inhibition release determination period. In this case, the drive permission determination flag F1 becomes "1" and the drive inhibition determination flag F2 becomes "0", and the starter 200 is thus brought into the drive permission state. In other words, at the time point T4 earlier than a time point T5 when the third reverse rotation crank signal is input, the drive inhibition state of the starter 200 is released. Moreover, the measurement timer is cleared (t_ct=0).

Note that, after the time point T4 when the drive inhibition release determination period has elapsed from the time point T3, the starter 200 is again brought into the drive permission state, and the starter 200 carries out the driving when the above-mentioned restart requirement is satisfied.

As described above, FIG. 5 exemplifies a case where the RPM NE at the time point T3 when the second reverse rotation crank signal is input is higher than the starter drivable RPM lower limit value Ne_L.

On this occasion, if the third reverse rotation crank signal is input before the drive permission lower limit value corresponding period T_l elapses from the input of the second reverse rotation crank signal, the engine 101 is reversely rotated, and the actual RPM of the engine 101 is higher than the starter drivable RPM lower limit value Ne_L. In this case, the actual RPM of the engine 101 is not included in the drivable RPM range, and the drive inhibition state of the starter 200 is thus not released.

In contrast, if the third reverse rotation crank signal is not input before the drive permission lower limit value corresponding period T_l elapses from the input of the second reverse rotation crank signal, the engine 101 is reversely rotated, and the actual RPM of the engine 101 is lower than the starter drivable RPM lower limit value Ne_L when the drive permission lower limit value corresponding period T_l elapses. In this case, the actual RPM of the engine 101 has passed the RPM peak, and is included in the drivable RPM range, and the drive inhibition state of the starter 200 is thus released.

As described above, in this case, the ECU 300 can release the drive inhibition state of the starter 200 without detecting the RPM peak based on the calculation result of the RPM NE of the engine 101 at the time point T4, which is different from the conventional technology. In other words, the ECU 300 can appropriately release the drive inhibition state of the starter 200 only based on the two inputs of the reverse rotation crank signal depending on the rotation state of the engine 101.

A description is now given of the timing chart of FIG. 6. Note that, in FIG. 6, an operation in the period from a time point before the time point T1 to the time point T3 is the same as the operation described above referring to FIG. 5, and a description thereof is therefore omitted.

At the time point T3, the output signal of the crank angle sensor 113 becomes the second reverse rotation crank signal. In this case, the crank counter CRK is subtracted by the predetermined value, and simultaneously, the reverse rotation crank pulse counter REV_CRK is counted up from 1 to 2. Moreover, the time interval t_crk between the crank signals is calculated, and simultaneously, the count up of the measurement timer starts.

On this occasion, at the time point T3 when the second reverse rotation crank signal is input, the time interval t_crk (1,2) is calculated, and is compared in magnitude with the drive permission lower limit value corresponding period T_l as described above. Then, the drive inhibition release determination period is determined depending on the comparison result. Note that, in FIG. 6, unlike in FIG. 5, the time interval t_crk(1,2) is equal to or longer than the drive permission lower limit value corresponding period T_l, and the drive inhibition release determination period thus corresponds to the time interval t_crk(1,2).

At the time point T4, the elapsed time t_ct from the time point T3 measured by the measurement timer becomes equal to or longer than the time interval t_crk(1,2), which is the drive inhibition release determination period. In this case, the drive permission determination flag F1 becomes "1" and drive inhibition determination flag F2 becomes "0", and the starter 200 is thus brought into the drive permission state. In other words, at the time point T4 earlier than the time point when the third reverse rotation crank signal is input, the drive inhibition state of the starter 200 is released. Moreover, the measurement timer is cleared (t_ct=0).

Note that, after the time point T4 when the drive inhibition release determination period has elapsed from the time point T3, the starter 200 is again brought into the drive permission state, and the starter 200 carries out the driving when the above-mentioned restart requirement is satisfied.

As described above, FIG. 6 exemplifies a case where the RPM NE at the time point T3 when the second reverse rotation crank signal is input is lower than the starter drivable RPM lower limit value Ne_L.

On this occasion, if the third reverse rotation crank signal is input before the time interval t_crk(1,2) elapses from the input of the second reverse rotation crank signal, the engine 101 is reversely rotated, and the actual RPM of the engine 101 is higher than the RPM NE at the time point T3. In this case, the actual RPM of the engine 101 does not reach the RPM peak, and the drive inhibition state of the starter 200 is thus not released.

In contrast, if the third reverse rotation crank signal is not input before the time interval t_crk(1,2) elapses from the input of the second reverse rotation crank signal, the engine 101 is reversely rotated, and the actual RPM of the engine 101 is lower than the RPM NE at the time point T3 when the time interval t_crk(1,2) elapses. In this case, the actual RPM of the engine 101 has passed the RPM peak, and the drive inhibition state of the starter 200 is thus released.

As described above, the ECU 300 can release the drive inhibition state of the starter 200 without detecting the RPM peak based on the calculation of the RPM NE of the engine 101 at the time point when the third reverse rotation crank signal is input, which is different from the conventional technology. In other words, the ECU 300 can appropriately release the drive inhibition state of the starter 200 only based on the two inputs of the reverse rotation crank signal depending on the rotation state of the engine 101.

In this way, the ECU 300 can release the drive inhibition state of the starter 200 when the drive inhibition release determination period set depending on the time interval t_crk between the crank signals (time interval between the time point T2 and the time point T3), which are the first reverse rotation crank signal and the second reverse rotation crank signal, and the drive permission lower limit value corresponding period T_l corresponding to the starter drivable RPM lower limit value Ne_L elapses before the third reverse rotation crank signal is input.

As a result, the drive inhibition state of the starter 200 can quickly be released depending on the rotation state after the engine 101 enters the reverse rotation state.

Moreover, if the time interval t_crk between the crank signals, which are the first reverse rotation crank signal and the second reverse rotation crank signal, is shorter than the drive permission lower limit value corresponding period T_l, the ECU 300 releases the drive inhibition state of the starter 200 when the elapsed time t_ct measured by the measurement timer reaches the drive permission lower limit value corresponding period T_l. On the other hand, if the time interval t_crk between the crank signals, which are the first reverse rotation crank signal and the second reverse rotation crank signal, is equal to or longer than the drive permission lower limit value corresponding period T_l, the ECU 300 releases the drive inhibition state of the starter 200 when the elapsed time t_ct measured by the measurement timer reaches the time interval t_crk.

As a result, at a time point earlier than the time point when the third reverse rotation crank signal is input, the drive inhibition state of the starter 200 can be appropriately released depending on the rotation state of the engine 101, and the period of the drive inhibition state does not thus unnecessarily extend.

Moreover, the ECU 300 determines whether the rotation state of the engine 101 is the forward rotation state or the reverse rotation state based on the change in the output signal of the crank angle sensor. As a result, the rotation state of the engine 101 is accurately detected, and an erroneous operation is thus prevented. For example, the drive inhibition state of the starter 200 is not released by mistake in such a rotation state that the drive inhibition state should not be released.

As described above, according to the first embodiment, the drive inhibition state of the starter is released when the drive inhibition release determination period set depending on the time interval between the time point when the first reverse rotation crank signal is detected and the time point when the second reverse rotation crank signal is detected and the drive permission lower limit value corresponding period corresponding to the starter drivable RPM lower limit value elapses before the third reverse rotation crank signal is input. As a result, the drive inhibition state of the starter can be properly released depending on the rotation state of the internal combustion engine, and a period of the drive inhibition state of the starter can be reduced. Thus, when the restart requirement is satisfied, the starter can be quickly driven to restart the internal combustion engine.

According to the first embodiment, the case where the starter is brought into the drive inhibition state after the rotation state of the internal combustion engine is determined to change to the reverse rotation state based on the detection result of the reverse rotation crank signal has been exemplified for description, but the present invention is not limited to this case. Specifically, the present invention can also be applied to a case where the starter is brought into the drive inhibition state after the rotation state of the internal combustion engine is determined to change from the forward rotation state to the reverse rotation state based on a calculation result of the RPM of the internal combustion engine, and the same effects can be provided also in this case.

What is claimed is:

1. An internal combustion engine automatic stop/restart device for stopping an internal combustion engine when an automatic stop requirement for automatically stopping the internal combustion engine is satisfied, and restarting the internal combustion engine when a restart requirement for restarting the internal combustion engine is satisfied after the automatic stop requirement is satisfied, the internal combustion engine automatic stop/restart device comprising:
   a starter for starting the internal combustion engine;
   an RPM calculation unit for calculating an RPM of the internal combustion engine based on a crank signal, which is an output signal of a crank angle detection unit for detecting a crank angle of the internal combustion engine;
   a rotation direction determination unit for determining whether the crank signal output by the crank angle detection unit is a forward rotation crank signal corresponding to a case where a rotation state of the internal combustion engine is a forward rotation state or a reverse rotation crank signal corresponding to a case where the rotation state is a reverse rotation state;
   a drive inhibition determination unit for bringing the starter into a drive inhibition state when the RPM calculated by the RPM calculation unit is not included in a drivable RPM range from a starter drivable RPM lower limit value to a starter drivable RPM upper limit value, which are prescribed in advance, and bringing the starter into the drive inhibition state when the crank signal output by the crank angle detection unit changes from the forward rotation crank signal to the reverse rotation crank signal;

a drive inhibition release unit for calculating, when the crank angle detection unit outputs a second reverse rotation crank signal after outputting a first reverse rotation crank signal, which is a first reverse rotation crank signal when the forward rotation crank signal changes to the reverse rotation crank signal, a time interval between a first time point when the first reverse rotation crank signal is input and a second time point when the second reverse rotation crank signal is input, and releasing the drive inhibition state when a third reverse rotation crank signal is not input following the second reverse rotation crank signal until a drive inhibition release determination period set depending on the calculated time interval and a drive permission lower limit value corresponding period, which is a period acquired by converting the starter drivable RPM lower limit value, elapses from the second time point; and a restart control unit for driving the starter to restart the internal combustion engine when the restart requirement is satisfied and the starter is not in the drive inhibition state, wherein when the time interval is shorter than the drive permission lower limit value corresponding period, the drive inhibition release unit sets the drive permission lower limit value corresponding period as the drive inhibition release determination period, and when the time interval is equal to or longer than the drive permission lower limit value corresponding period, the drive inhibition release unit sets the time interval as the drive inhibition release determination period.

2. An internal combustion engine automatic stop/restart device according to claim 1, wherein the rotation direction determination unit determines whether the crank signal output by the crank angle detection unit is the forward rotation crank signal or the reverse rotation crank signal depending on a LOW period, which is a total period when the crank signal can take a LOW value in each cycle.

3. An internal combustion engine automatic stop/restart method to be carried out by an engine control unit (ECU) in an internal combustion engine automatic stop/restart device including a starter for starting an internal combustion engine, the internal combustion engine automatic stop/restart method, comprising:

an automatic stop control step of stopping the internal combustion engine when an automatic stop requirement for automatically stopping the internal combustion engine is satisfied;

an RPM calculation step of calculating an RPM of the internal combustion engine based on a crank signal, which is an output signal of a crank angle detection unit for detecting a crank angle of the internal combustion engine;

a drive inhibition determination step of bringing the starter into a drive inhibition state when the RPM calculated in the RPM calculation step is not included in a drivable RPM range from a starter drivable RPM lower limit value to a starter drivable RPM upper limit value, which are prescribed in advance, and bringing the starter into the drive inhibition state when the crank signal output by the crank angle detection unit changes from a forward rotation crank signal to a reverse rotation crank signal;

a drive inhibition release step of calculating, when the crank angle detection unit outputs a second reverse rotation crank signal after outputting a first reverse rotation crank signal, which is a first reverse rotation crank signal when the forward rotation crank signal changes to the reverse rotation crank signal, a time interval between a first time point when the first reverse rotation crank signal is input and a second time point when the second reverse rotation crank signal is input, and releasing the drive inhibition state when a third reverse rotation crank signal is not input following the second reverse rotation crank signal until a drive inhibition release determination period set depending on the calculated time interval and a drive permission lower limit value corresponding period, which is a period acquired by converting the starter drivable RPM lower limit value, elapses from the second time point; and a restart control step of driving the starter to restart the internal combustion engine when a restart requirement for restarting the internal combustion engine is satisfied after the automatic stop requirement is satisfied, and the starter is not in the drive inhibition state, wherein the drive inhibition release step comprises setting the drive permission lower limit value corresponding period as the drive inhibition release determination period when the time interval is shorter than the drive permission lower limit value corresponding period, and setting the time interval as the drive inhibition release determination period when the time interval is equal to or longer than the drive permission lower limit value corresponding period.

* * * * *